(12) United States Patent
Gallardo et al.

(10) Patent No.: US 11,372,844 B1
(45) Date of Patent: Jun. 28, 2022

(54) SYSTEMS AND METHODS FOR STATELESS ASYNCHRONOUS DATABASE LOADING WHILE MAINTAINING ORDERING

(71) Applicant: Symantec Corporation, Mountain View, CA (US)

(72) Inventors: Paola Gallardo, Culver City, CA (US); Christian Tallarico, Redondo Beach, CA (US); Michael Shavell, Merrimack, NH (US)

(73) Assignee: NortonLifeLock Inc., Tempe, AZ (US)

( * ) Notice: Subject to any disclaimer, the term of this patent is extended or adjusted under 35 U.S.C. 154(b) by 667 days.

(21) Appl. No.: 16/179,871

(22) Filed: Nov. 2, 2018

(51) Int. Cl.
  *G06F 16/23* (2019.01)
  *G06F 40/205* (2020.01)

(52) U.S. Cl.
  CPC ...... *G06F 16/2379* (2019.01); *G06F 16/2365* (2019.01); *G06F 40/205* (2020.01)

(58) Field of Classification Search
  CPC . G06F 16/2379; G06F 16/2365; G06F 40/205
  USPC .......................................................... 707/687
  See application file for complete search history.

(56) References Cited

U.S. PATENT DOCUMENTS

| | | | | |
|---|---|---|---|---|
| 5,307,481 | A | * | 4/1994 | Shimazaki .......... G06F 11/1662 714/11 |
| 6,088,705 | A | * | 7/2000 | Lightstone ............ G06F 16/254 |
| 9,043,278 | B1 | * | 5/2015 | Wilson .................... G06F 16/27 707/626 |
| 2005/0192989 | A1 | * | 9/2005 | Adiba ................... G06F 16/273 |
| 2015/0081639 | A1 | * | 3/2015 | Jin ...................... G06F 11/1451 707/644 |
| 2019/0095491 | A1 | * | 3/2019 | Bhattacharjee ..... G06F 16/2433 |
| 2019/0325055 | A1 | * | 10/2019 | Lee ..................... G06F 16/1734 |

* cited by examiner

*Primary Examiner* — William B Partridge
*Assistant Examiner* — Lahcen Ennaji
(74) *Attorney, Agent, or Firm* — FisherBroyles LLP (57) ABSTRACT

The disclosed computer-implemented method for asynchronously and statelessly loading data while maintaining ordering may include parsing multiple data records, appending an identifier to each data record, where the appended identifier establishes a parsing order indicating an order in which each data record was parsed, inserting the parsed data records into multiple persistent queues in parallel, and asynchronously loading the data records from the persistent queues into a database in parallel according to the appended identifiers. As such, the data records may be stored in the database in the established parsing order. Various other methods, systems, and computer-readable media are also disclosed.

20 Claims, 7 Drawing Sheets

SYSTEMS AND METHODS FOR STATELESS ASYNCHRONOUS DATABASE LOADING WHILE MAINTAINING ORDERING

BACKGROUND

Modern databases are designed to receive and store an ever-increasing amount of data. This data may be written sequentially, or in parallel across multiple data storage devices. Databases themselves may span many different storage devices and, indeed, may span different geographical locations. In some cases, data files or data records may need to be stored in a certain order. For example, databases that store financial information may provide guarantees (e.g., Atomicity, Consistency, Isolation, Durability (ACID) guarantees) that the financial data was stored or updated appropriately. This data, however, is typically written to the databases in sequence to ensure that every data change is processed in order. Conventional database systems do not allow data to be provided to a database asynchronously or out of order, while at the same time maintaining a specific processing order.

The instant disclosure, therefore, identifies and addresses a need for systems and methods for asynchronously and statelessly loading data while maintaining data ordering.

SUMMARY

As will be described in greater detail below, the instant disclosure describes various systems and methods for asynchronously and statelessly loading data while maintaining data ordering.

In one example, a method for asynchronously and statelessly loading data while maintaining data ordering may include parsing, by a processor, multiple different data records. The processor may then append an identifier to each data record. The appended identifier may establish a parsing order indicating the order in which each data record was parsed. The method may further include the processor inserting the parsed data records into multiple different persistent queues in parallel, and then asynchronously loading the data records from the persistent queues into a database in parallel according to the appended identifiers. In this manner, the data records may be stored in the database in the established parsing order.

In some examples, the method may further include comparing the appended identifier for a specified data record loaded into the persistent queues to an existing identifier associated with a corresponding existing database record. Then, upon determining that the appended identifier is more current than the existing identifier, the method may include loading the specified data record into the database.

In some examples, the method may further include comparing the appended identifier for a specified data record loaded into the persistent queues to an existing identifier associated with a corresponding existing database record. Then, upon determining that the appended identifier is older than the existing identifier, the method may include discarding the specified data record from the persistent queues.

In some examples, the appended identifier may include a counter or sequence number. In some cases, updates to data records may only be processed when the counter or sequence number is greater than corresponding counters or sequence numbers currently stored on the database.

In some examples, the appended identifier may include a timestamp. In some cases, updates to data records may only be processed when the time on the timestamp is greater than corresponding timestamps currently stored on the database.

In some examples, at least one of the data records may be processed out of order. The at least one data record processed out of order may be overwritten at a subsequent time by an asynchronously loaded data record with a higher identifier. In some examples, at least some of the data records may be parsed synchronously.

In one embodiment, a system for asynchronously and statelessly loading data while maintaining ordering may include at least one physical processor and physical memory that includes computer-executable instructions that, when executed by the physical processor, cause the physical processor to parse multiple data records and append an identifier to each data record. The appended identifier may establish a parsing order indicating the order in which each data record was parsed. The physical processor may insert the parsed data records into multiple persistent queues in parallel and then asynchronously load the data records from the persistent queues into a database in parallel according to the appended identifiers. As such, the data records may be stored in the database in the established parsing order.

In some examples, the data records may be asynchronously loaded according to various established conditions. At least one of the established conditions may indicate that the identifier appended to the data record is to be newer or higher than an existing identifier.

In some examples, at least one of the established conditions may indicate that data records having identifiers that are lower or older than an existing identifier are to be discarded without being loaded into the database.

In some examples, the identifiers may be stored as metadata associated with the data records. In some examples, each data record may include operations that are to be performed in relative to the data record in the database. In some examples, the parsed data records may be inserted asynchronously into the plurality of persistent queues in parallel.

In some examples, the identifiers may be appended on a local computer system before being inserted into the persistent queues. In some examples, the resulting database may include each data record as if each data record was executed in order.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to parse multiple data records, append an identifier to each data record, where the appended identifier establishes a parsing order indicating an order in which each data record was parsed, insert the parsed data records into multiple persistent queues in parallel, and asynchronously load the data records from the persistent queues into a database in parallel according to the appended identifiers. As such, the data records may be stored in the database in the established parsing order.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification.

Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for asynchronously and statelessly loading data while maintaining data ordering. As noted above, it may be necessary or desirable to store data in a specific order. For example, when reputation data files are to be stored in a database identifying website or domain reputations as legitimate or illegitimate sites, the reputation data files may need to be stored and/or updated in a specific order. In such cases, for instance, and as described below, a computer system may be designed to parse reputation data files and then send those parsed files to a persistent queue or message bus where they are then loaded into a database. In this example, the computer system may apply a counter or other identifier to the files before transferring the files to the persistent queue. This identifier may then be used when loading the data files into the database to ensure that only the latest versions of the files are kept in the database. In this manner, data files may be loaded asynchronously into the database and only the most up-to-date version of each file may be stored.

This asynchronous loading process allows many files to be loaded into the database in an asynchronous and potentially out-of-order manner. Moreover, in the embodiments herein, data files may be transferred in parallel into persistent queues prior to being loaded into the database. The use of counters or other identifiers may ensure that only the most up-to-date versions are kept in the database. By allowing the use of asynchronous (and potentially out-of-order) loading, the number of operations performed per second may be increased from 300 operations/second in current systems to over 50,000 operations/second in the embodiments herein. This is over 16,000% faster.

Indeed, by applying identifiers prior to loading messages into the persistent queue, and by using the identifiers to ensure that only the most up-to-date versions are kept in the database, the embodiments herein may allow the use of asynchronous, parallel loading (into both the persistent queues and into the database), while maintaining a specified data ordering. Conventional systems that allow parallel loading do not maintain data order. And, in cases where ordering needed to be maintained, only synchronous database loading would be implemented. Accordingly, this 16,000% increase in operations/second provided by the embodiments herein not only improves data throughput to the persistent queues, but also improves data throughput to the database, allowing the database to operate much faster than older systems. This is especially true when operating with constraints including the constraint to maintain the processing order of the stored data.

Figure 1:
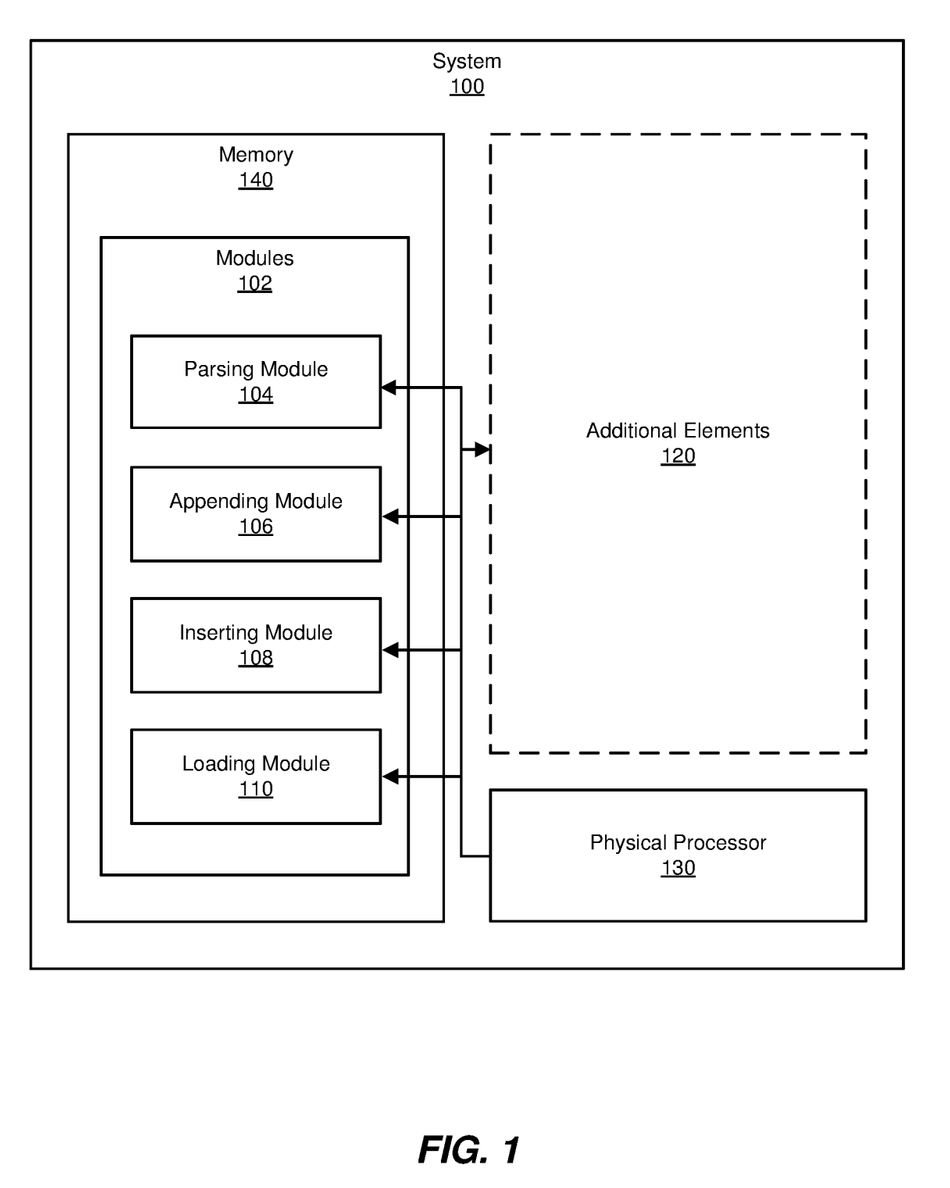
FIG. 1 is a block diagram of an example system for asynchronously and statelessly loading data while maintaining ordering.
Figure 2:
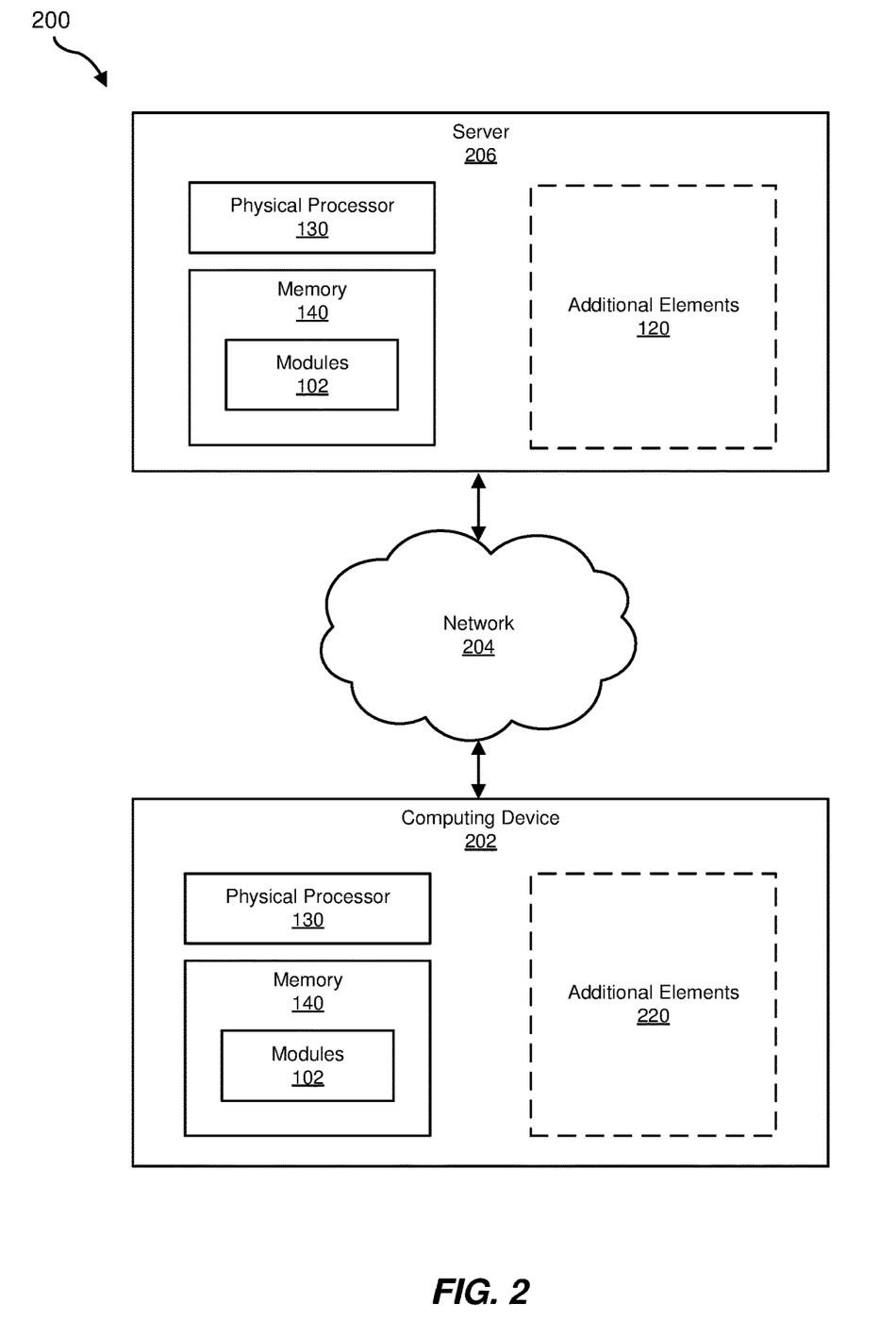
FIG. 2 is a block diagram of an additional example system for asynchronously and statelessly loading data while maintaining ordering.
Figure 4:
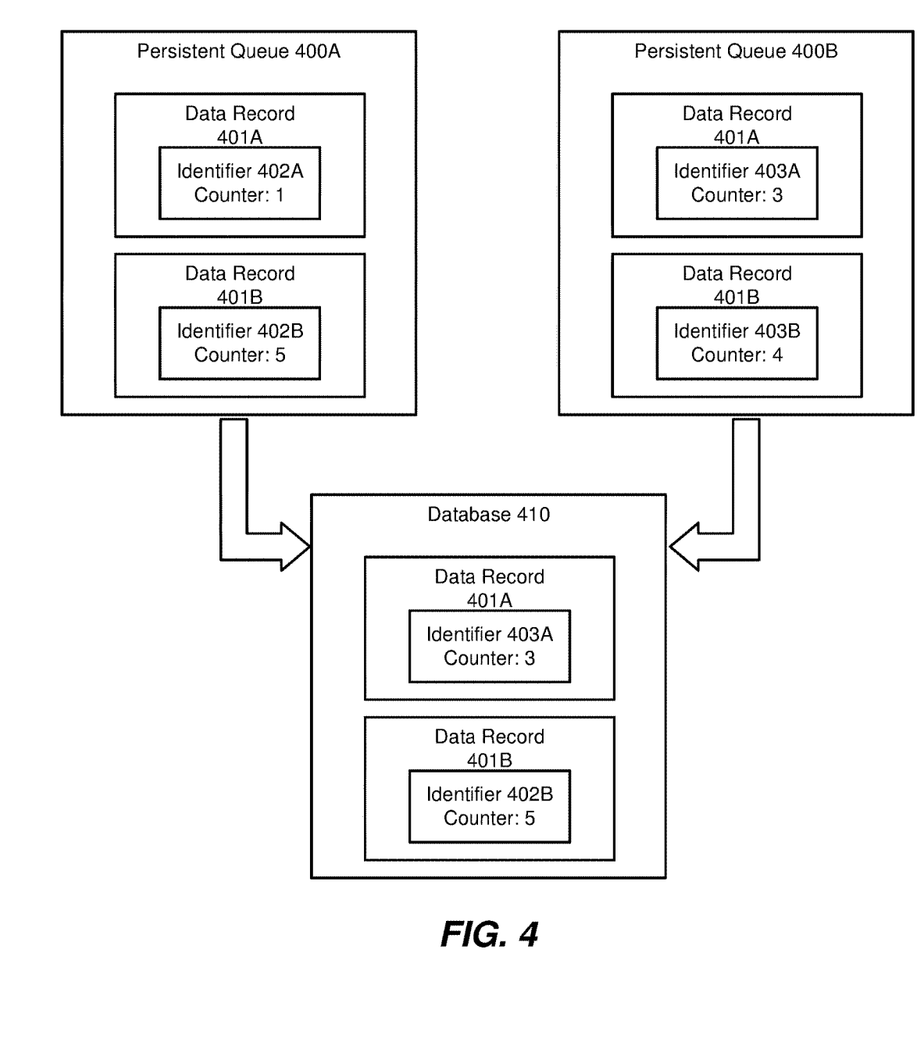
FIG. 4 is a block diagram of an embodiment in which data records are loaded from a persistent queue into a database.
Figure 5:
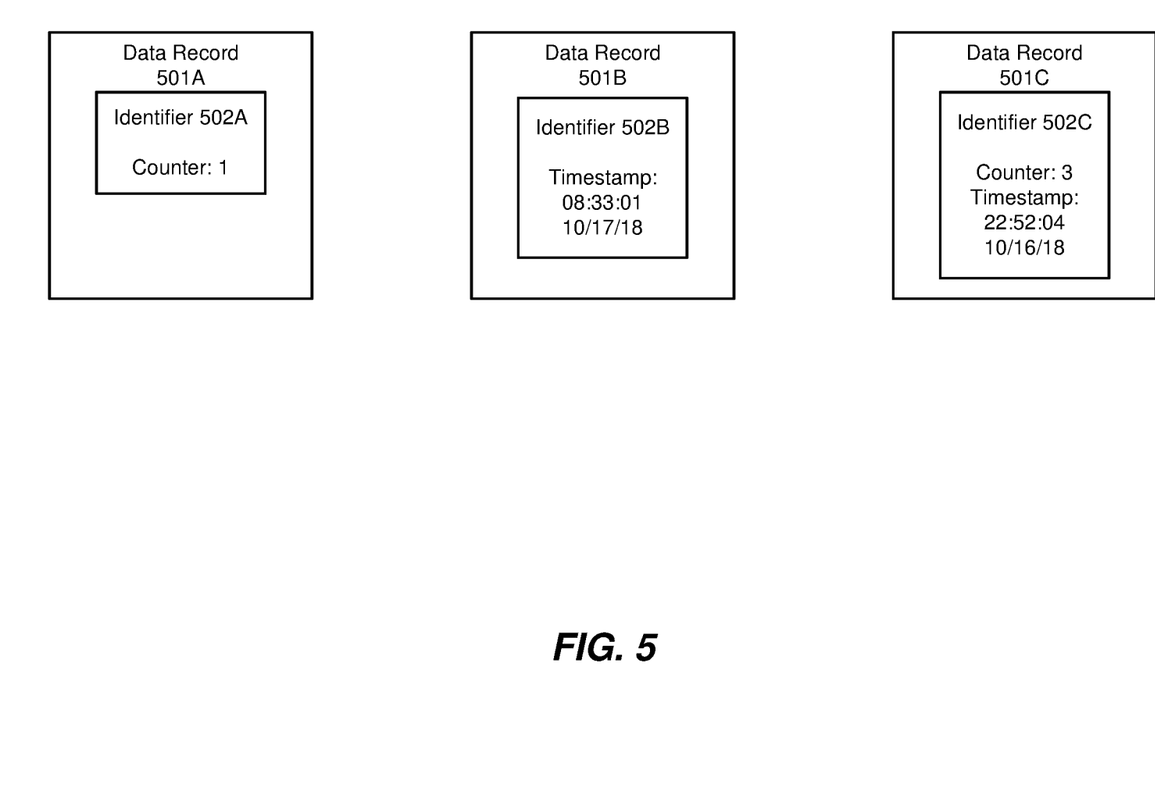
FIG. 5 illustrates a plurality of data records having different types of identifiers including counters and timestamps.

The following will provide, with reference to FIGS. 1-2, detailed descriptions of example systems for asynchronously and statelessly loading data while maintaining ordering. Detailed descriptions of corresponding computer-implemented methods will also be provided in connection with FIG. 3. Detailed descriptions of data flows from persistent queues to databases, including flows of data records and associated identifiers are illustrated in FIGS. 4 and 5. In addition, detailed descriptions of an example computing system and network architecture capable of implementing one or more of the embodiments described herein will be provided in connection with FIGS. 6 and 7, respectively.

FIG. 1 is a block diagram of an example system 100 for asynchronously and statelessly loading data while maintaining ordering. As illustrated in this figure, example system 100 may include one or more modules 102 for performing one or more tasks. As will be explained in greater detail below, modules 102 may include a parsing module 104, an appending module 106, an inserting module 108, and a loading module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate asynchronously and statelessly loading data while maintaining ordering. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more additional elements introduced in FIG. 1, such as additional elements 120. Additional elements 120 may generally represent any type or form of data store including a distributed or local database. In one example, additional elements 120 may include a cloud data store that is accessible via the internet.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to asynchronously and statelessly load data while the order in which the data is parsed. For example, and as will be described in greater detail below, one or more of modules 102 may cause computing device 202 and/or server 206 to recite steps of method claim using FIG. 2

Server 206 generally represents any type or form of computing device that is capable of accessing and/or storing data on a database. In some embodiments, the server 206 may be a reputation server configured to access and update reputation data. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Computing device 202 generally represents any type or form of computing device capable of reading computer-executable instructions. At least in some embodiments, the computing device 202 may include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network. As in FIG. 1, the additional elements 220 may generally represent any type or form of data store including local, or distributed, cloud-based data stores.

Figure 3:
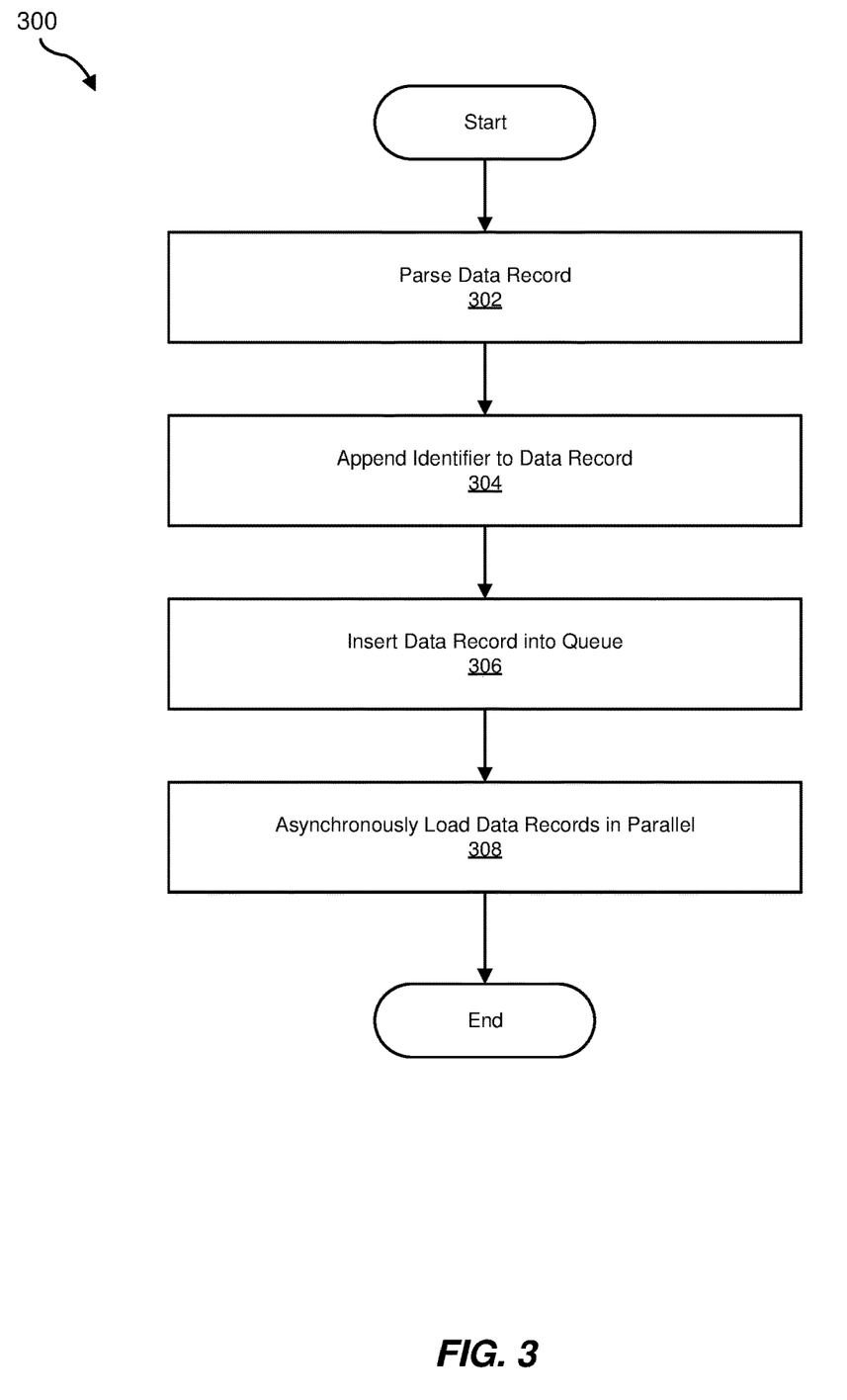
FIG. 3 is a flow diagram of an example method for asynchronously and statelessly loading data while maintaining ordering.

FIG. 3 is a flow diagram of an example computer-implemented method 300 for asynchronously and statelessly loading data while maintaining ordering. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may implement a processor (e.g., 130) to parse multiple different data records. For example, parsing module 104 may, as part of computing device 202 in FIG. 2, parse data records 401A and/or 401B of FIG. 4. The data records 401A/401B may represent substantially any type of data, and may be full data files, partial data files, data blobs or other data structures. The data may be encrypted and/or formatted in a variety of different manners. Although only two data records are shown in FIG. 4, for simplicity, it will be understood that the databases and persistent queues described herein may access and/or store substantially any number of data records. In some cases, the data records are part of the data files (e.g., metadata), and in other cases, the data records are separate files stored in conjunction with the underlying data files. The parsing module 104 may parse or otherwise access one or more data records that are to be stored in a data store. The parsing may be performed synchronously to maintain a specified ordering in the data records.

As noted above, the additional elements 120/220 may represent any type of local or distributed data store. Before the data records that were parsed by the parsing module 104 are stored in the data store(s), the appending module 106 may append an identifier to each data record at step 304. Indeed, the appending module 106 may, for example, append identifier 402A to data record 401A, or may append identifier 402B to data record 401B. The appended identifier may establish a parsing order indicating the order in which each data record was parsed. In some embodiments, as noted above, it may be desirable or even necessary to keep track of the order in which data records are parsed. In order for traditional systems to maintain such an ordering, they would need to process each data record sequentially (including loading it onto a persistent queue and loading it from the queue into a database), thereby maintaining the ordering.

In the embodiments herein, the data records (e.g., 401A/401B) may be processed asynchronously and out of order. The appended identifier (e.g., 402A/402B) may thus establish the parsing order which may be used at a later time to ensure that the proper version of each data record is stored. Thus, the embodiments herein may guarantee that, at some future point in time, the state of the database will be just as it would be if the data records had been processed sequentially, in order, even though the methods herein allow for asynchronous, out-of-order processing.

The appended identifiers may include counters or sequence numbers. As shown in FIG. 5, for example, data record 501A may include appended identifier 502A. The identifier 502A includes a counter that is currently at 1, indicating it is the first parsed version of data record 501A. If a newer version of data record 501A is processed, it will have a counter of 2 or higher and, as such, may overwrite the data record with the counter of 1. Other types of identifiers may also be used. For instance, data record 501B may include identifier 502B. The identifier 502B may include a timestamp that reads 08:33:01, 10/17/18, indicating that it was parsed at 8:33:01 am on Oct. 17, 2018. Identifier 502C of data record 501C may include both a timestamp and a counter. If the same data record (e.g., 501B or 501C) were to be parsed at a later time (e.g., with an updated version), the updated version would have a newer timestamp. In some cases, updates to data records may only be processed when the counter, sequence number or timestamp is greater than corresponding counters, sequence numbers or timestamps currently stored on the database. This process will be explained further below.

Returning to method 300 of FIG. 3, the method 300 may include inserting the parsed data records into multiple different persistent queues in parallel at step 306, and then asynchronously loading the data records from the persistent queues into a database in parallel according to the appended identifiers at step 308. For example, the inserting module 108 of FIG. 1 may insert parsed data records (e.g., 401A/401B of FIG. 4) into persistent queues 400A and/or 400B. The persistent queues 400A/400B may be message buses or other types of data queues that are accessible by one or more databases (e.g., database 410). The databases may access and load data records from these queues. The persistent queues 400A/400B may ensure that no data is lost while in queue, and may further allow the data records to be loaded in parallel into the databases.

For instance, while only two persistent queues 400A/400B are shown in FIG. 4, it will be understood that substantially any number of persistent queues may be used in conjunction with a database. The database 410 may communicate with and load data from any number of these queues in parallel. As each data record is inserted into a queue 400A/400B (e.g., by the inserting module 108 of FIG. 1), the loading module 110 may then asynchronously access and process those data records, loading them into the database 410. In some cases, this asynchronous loading of data records into the database 410 may result in conflicts. For example, if two versions of the same data record are loaded into the database at substantially the same time, or at subsequent times, the database may be configured to compare the appended identifiers to any existing identifiers associated with the data record that are already stored on the database. Then, upon determining that a given appended identifier is more current than an existing identifier already stored on the database, the loading module 110 may load that data record into the database.

For example, as shown in FIG. 4, two (or more) different persistent queues 400A and 400B may be used to feed data records to the database 410 for storage. In the illustrated embodiment, each persistent queue includes data records 401A and 401B. These data records 401A and 401B, however, each have different identifiers. For example, data record 401A in persistent queue 400A includes identifier 402A showing a counter of 1. Persistent queue 400B has a version of data record 401A with a different identifier 403A that shows a counter of 3. In some cases, the same data record may have the same or a different identifier in each updated version. The database 410 may process data record 401A from either queue in an asynchronous and potentially out-of-order manner.

If the data record 401A having identifier 402A and a counter value of 1 is processed first, the database 410 may check to see if there are previously stored versions of data record 401A. If not, then the counter of 1 would be the newest version and the database 410 may store the data record 401A having identifier 402A. If the database 410 then processes an updated version of data record 401A having a new identifier 403A and an updated counter value of 3, the database may again check to see if there are previously stored versions of data record 401A. This time, the database 410 may determine that a previous version of data record 401A is already stored on the database. The database 410 may then perform a comparison of the two data records to determine which has the highest counter (or most recent timestamp if timestamps are used in the identifier). Upon determining that the data record 401A with the identifier 403A has the highest counter value (3), the data record 401A having the identifier 403A may be stored in the database 410.

Conversely, if data record 401A having identifier 403A and a counter value of 3 is processed first, the database 410 may check to see if there are previously stored versions of data record 401A. If not, then the counter of 3 would be the newest version and the database 410 may store the data record 401A having identifier 403A. If the database 410 then processes another version of data record 401A having a different identifier 402A and a lower counter value of 1, the database may again check to see if there are previously stored versions of data record 401A. The database 410 may determine that a previous version of data record 401A is already stored on the database. The database 410 may then perform a comparison of the two data records to determine which has the highest counter or most recent timestamp. Upon determining that the data record 401A with the identifier 403A has the highest counter value (3), the data record 401A having the identifier 403A may be stored in the database 410, and the data record having identifier 402A may be discarded prior to being loaded into the database. In this manner, data records may be loaded asynchronously into the database 410, while maintaining the established parsing order.

Data record 401B may be processed in a similar manner. With data record 401B, regardless of the order in which the data records 401B having identifiers 402B and 403B are processed, the version having the highest counter value or highest timestamp value will ultimately be stored in database 410. If the older version is stored first, the newer version may overwrite the older version, and if the newer version is stored first, the older version may be discarded before being stored in the database 410. Accordingly, many different files and versions of files may be continually fed through the persistent queues 400A/400B to the database 410 in an asynchronous and stateless manner. Regardless of the order in which the data records are processed, however, ultimately only the most up-to-date versions of each data record will be stored in the database. Moreover, each stored data record may have an appended identifier indicating the order in which that data record was parsed in relation to other data records and/or in relation to other versions of the same data record.

In one embodiment, a system for asynchronously and statelessly loading data while maintaining ordering may include at least one physical processor and physical memory that includes computer-executable instructions that, when executed by the physical processor, cause the physical processor to parse multiple data records and append an identifier to each data record. The appended identifier may establish a parsing order indicating the order in which each data record was parsed. The physical processor may also insert the parsed data records into multiple persistent queues in parallel and then asynchronously load the data records from the persistent queues into a database in parallel according to the appended identifiers. As such, the data records may be stored in the database in the established parsing order.

In some embodiments, data records may be asynchronously loaded into a database according to various established conditions or settings. In such cases, one of these established conditions may indicate that the identifier appended to the data record is to be newer or higher than an existing identifier. For instance, as shown in FIG. 4, database 410 may load data record 401B having identifier 402B with a counter value of 5 into the database. If an older version of that file 401B having an identifier 403B with a counter value of 4 is inserted into the persistent queue 400B asynchronously at a later point in time, the database 410 may access the identifier (or a least the counter value or timestamp) and determine that a newer version of data record 401B with a higher counter value is already loaded into the database. As such, according to the established conditions, the data record 401B having identifier 403B may be discarded before being loaded into the database.

The identifiers 402A, 402B, 403A, 403B, etc. may be stored as metadata associated with the data records. Indeed, the identifiers may be stored as part of a given data file or data record or may be stored as separate data structures. The counters and/or timestamps may be updated or otherwise changed in combination with updates to the underlying data file or may be changed separate from the underlying data file. In some embodiments, each data record may include operations that are to be performed relative to the data record in the database. For example, data record 401A may identify one or more operations that are to be performed by the database 410. In cases where the database stores reputation data for websites, persons or other entities, the operations may include updating the website, person or entity with a +1 good reputation, or a −1 bad reputation rating.

In some embodiments, the identifiers may be appended on a local computer system (e.g., computing device 202) before being inserted into the persistent queues (e.g., 400A/400B). Once the data records have been parsed and have had an identifier appended thereto, the parsed data records may be inserted asynchronously into the persistent queues 400A/400B or into other queues. As such, data records may be inserted into the persistent queues in parallel and out of order and may also be loaded into the database in parallel and out of order, all while maintaining ordering of the files. Thus, even though some files may be loaded into the database out of their parsing order, the database 410 may perform file comparisons and may overwrite existing files or discard files in the queue to preserve the proper state and remove file conflicts. Thus, the resulting database may include each data record as if each data record was processed in order, but while still reaping the benefits of multi-thread performance and asynchronous data requests.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to parse multiple data records, append an identifier to each data record, where the appended identifier establishes a parsing order indicating an order in which each data record was parsed, insert the parsed data records into multiple persistent queues in parallel, asynchronously load the data records from the persistent queues into a database in parallel according to the appended identifiers. As such, the data records may be stored in the database in the established parsing order.

Figure 6:
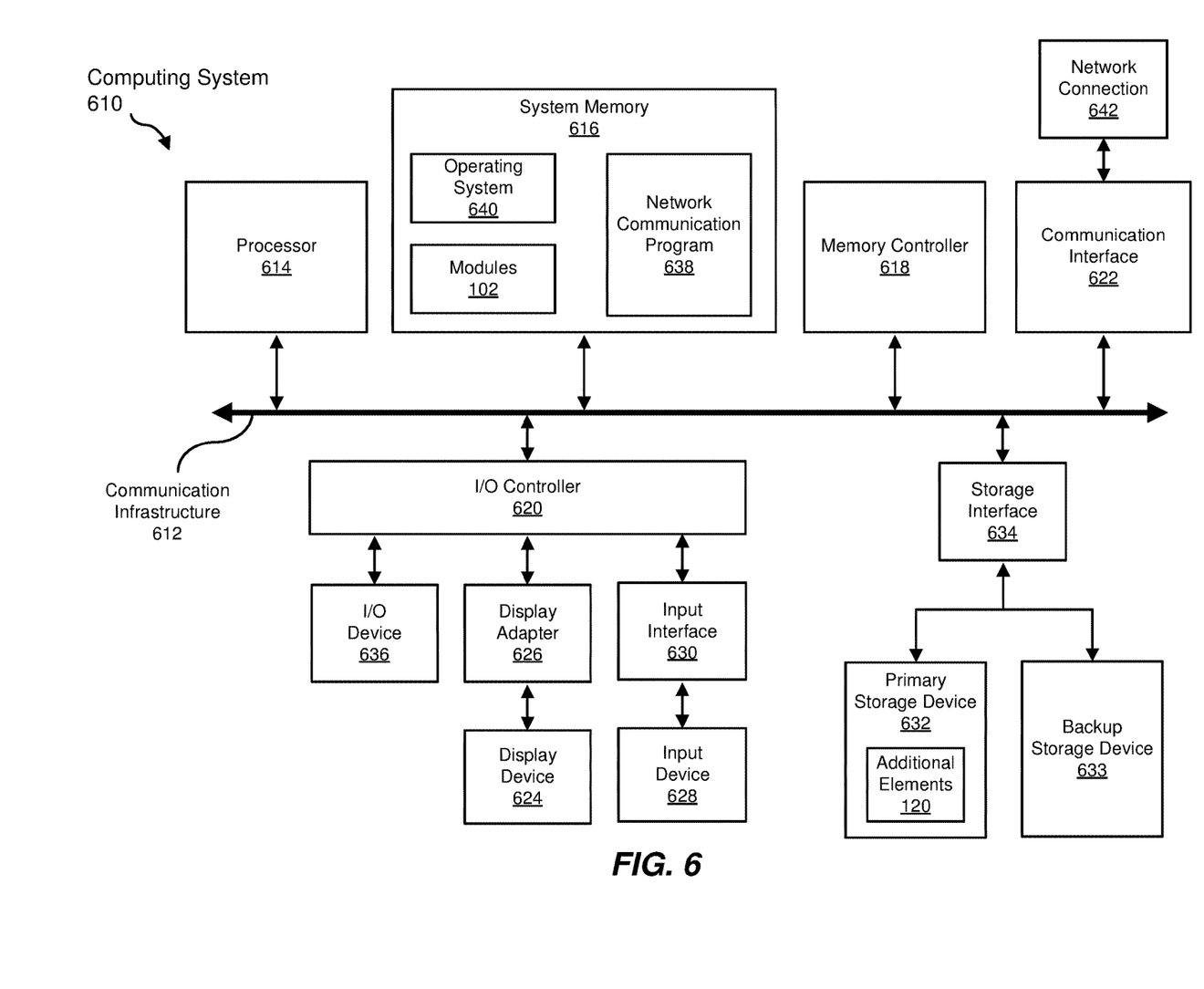
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, the additional elements 120 from FIG. 1 may include or be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
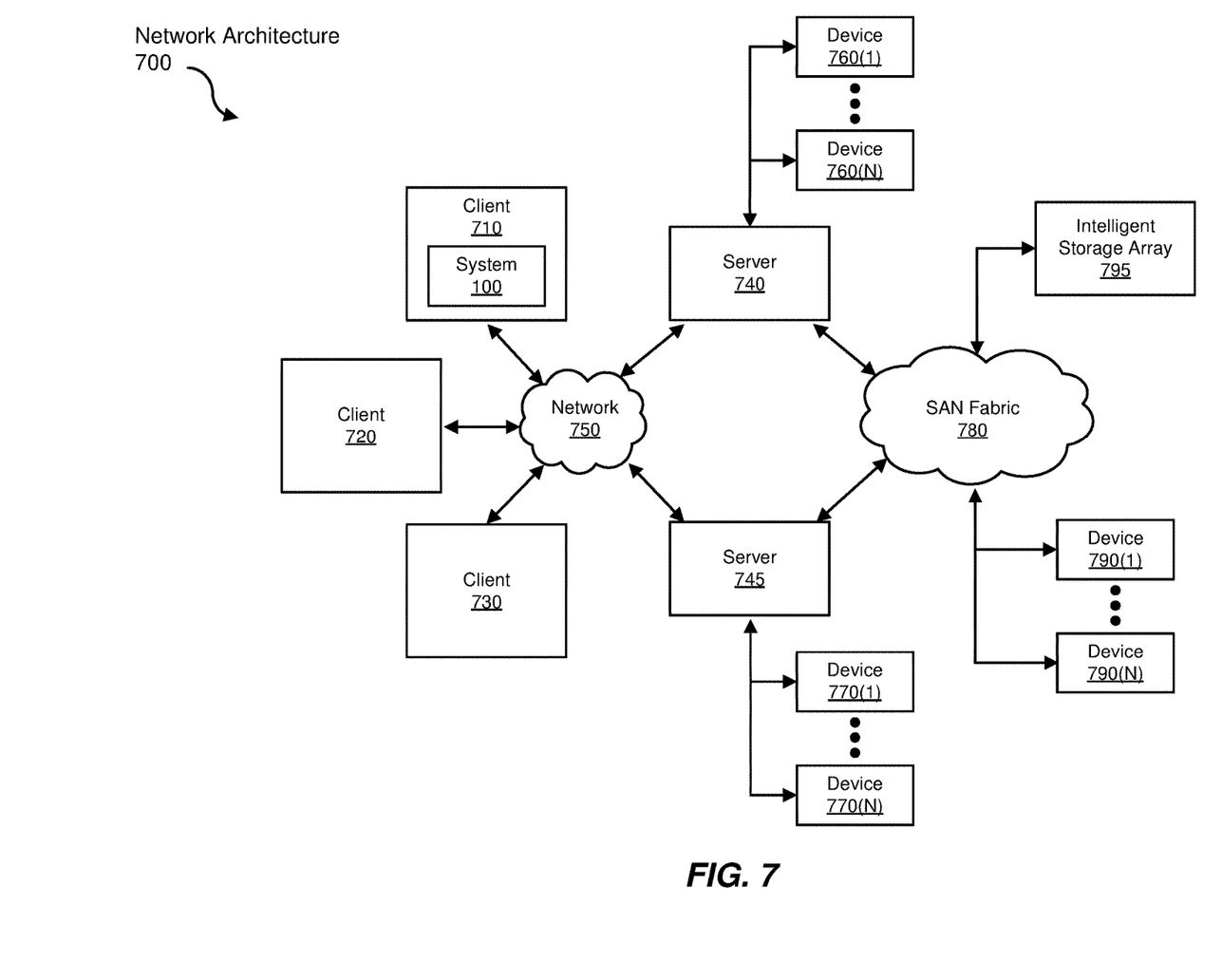
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for asynchronously and statelessly loading data while maintaining ordering.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive data to be transformed, transform the data by appending an identifier, output a result of the transformation to a message queue, use the result of the transformation to update database files, and store the result of the transformation in the database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

We claim:

1. A computer-implemented method for asynchronously and statelessly loading data while maintaining ordering, at least a portion of the method being performed by a computing device comprising at least one processor, the method comprising:
    parsing, by the processor, a plurality of data records;
    appending, by the processor, an identifier to each data record, wherein the appended identifier establishes a parsing order indicating an order in which each data record was parsed and further indicates the data record's relation to other versions of the same data record;
    inserting, by the processor, the plurality of parsed data records into a plurality of persistent queues in parallel and out of order, wherein each persistent queue in the plurality of persistent queues is dimensioned to store at least some of the plurality of parsed data records with the appended identifiers out of order; and
    asynchronously loading, by the processor, the plurality of data records from the plurality of persistent queues into a database in parallel according to the appended identifiers, such that the plurality of data records is stored asynchronously in the database in the established parsing order.

2. The computer-implemented method of claim 1, further comprising:
    comparing, by the processor, the appended identifier for a specified data record loaded into the plurality of persistent queues to an existing identifier associated with a corresponding existing database record; and
    upon determining that the appended identifier is more current than the existing identifier, loading the specified data record into the database.

3. The computer-implemented method of claim 1, further comprising:
    comparing, by the processor, the appended identifier for a specified data record loaded into the plurality of persistent queues to an existing identifier associated with a corresponding existing database record; and
    upon determining that the appended identifier is older than the existing identifier, discarding the specified data record from the plurality of persistent queues.

4. The computer-implemented method of claim 1, wherein the appended identifier comprises a counter or sequence number.

5. The computer-implemented method of claim 4, wherein updates to data records are only processed when the counter or sequence number is greater than corresponding counters or sequence numbers currently stored on the database.

6. The computer-implemented method of claim 1, wherein the appended identifier comprises a timestamp.

7. The computer-implemented method of claim 6, wherein updates to data records are only processed when the time on the timestamp is greater than corresponding timestamps currently stored on the database.

8. The computer-implemented method of claim 1, wherein at least one of the data records is processed out of order.

9. The computer-implemented method of claim 8, wherein the at least one data record processed out of order is overwritten at a subsequent time by an asynchronously loaded data record with a higher identifier.

10. The computer-implemented method of claim 1, wherein at least some of the plurality of data records are parsed synchronously.

11. A system for asynchronously and statelessly loading data while maintaining ordering, the system comprising:
    at least one physical processor; and
    physical memory comprising computer-executable instructions that, when executed by the physical processor, cause the physical processor to:
    parse a plurality of data records;
    append an identifier to each data record, wherein the appended identifier establishes a parsing order indicating an order in which each data record was parsed and further indicates the data record's relation to other versions of the same data record;
    insert the plurality of parsed data records into a plurality of persistent queues in parallel and out of order, wherein each persistent queue in the plurality of persistent queues is dimensioned to store at least some of the plurality of parsed data records with the appended identifiers out of order; and asynchronously load the plurality of data records from the plurality of persistent queues into a database in parallel according to the appended identifiers, such that the plurality of data records is stored asynchronously in the database in the established parsing order.

12. The system of claim 11, wherein the plurality of data records is asynchronously loaded according to one or more established conditions.

13. The system of claim 12, wherein at least one of the established conditions indicates that the identifier appended to the data record is to be newer or higher than an existing identifier.

14. The system of claim 12, wherein at least one of the established conditions indicates that data records having identifiers that are lower or older than an existing identifier are discarded without being loaded into the database.

15. The system of claim 11, wherein the identifiers are stored as metadata associated with the data records.

16. The system of claim 11, wherein each data record includes one or more operations that are to be performed relative to the data record in the database.

17. The system of claim 11, wherein at least some of the plurality of parsed data records are inserted asynchronously into the plurality of persistent queues in parallel.

18. The system of claim 11, wherein the identifiers are appended on a local computer system before being inserted into the plurality of persistent queues.

19. The system of claim 11, wherein the database includes each data record as if each data record was executed in order.

20. A non-transitory computer-readable medium comprising one or more computer-executable instructions that, when executed by at least one processor of a computing device, cause the computing device to:

parse, by the processor, a plurality of data records;

append, by the processor, an identifier to each data record, wherein the appended identifier establishes a parsing order indicating an order in which each data record was parsed and further indicates the data record's relation to other versions of the same data record;

insert, by the processor, the plurality of parsed data records into a plurality of persistent queues in parallel and out of order, wherein each persistent queue in the plurality of persistent queues is dimensioned to store at least some of the plurality of parsed data records with the appended identifiers out of order; and asynchronously load, by the processor, the plurality of data records from the plurality of persistent queues into a database in parallel according to the appended identifiers, such that the plurality of data records is stored asynchronously in the database in the established parsing order.

* * * * *